United States Patent
Valero et al.

(10) Patent No.: US 11,975,978 B2
(45) Date of Patent: May 7, 2024

(54) PREPARATION OF PRECIPITATED SILICAS USEFUL AS FILLERS IN SILICON MATRICES

(71) Applicant: RHODIA CHIMIE, Aubervilliers (FR)

(72) Inventors: Remi Valero, Lyons (FR); Jean-Noel Jas, Fontaines sur Saone (FR); Joel Racinoux, Rochetaillée sur Saone (FR); Kyu-Min Hwang, Seoul (KR); Youn-Kwon Yoo, Inchon (KR); Soline De Cayeux, Lyons (FR)

(73) Assignee: RHODIA CHIMIE, Aubervilliers (FR)

( * ) Notice: Subject to any disclaimer, the term of this patent is extended or adjusted under 35 U.S.C. 154(b) by 35 days.

(21) Appl. No.: 17/345,945

(22) Filed: Jun. 11, 2021

(65) Prior Publication Data

US 2021/0309530 A1 Oct. 7, 2021

Related U.S. Application Data

(62) Division of application No. 11/921,073, filed as application No. PCT/FR2006/001207 on May 29, 2006, now abandoned.

(30) Foreign Application Priority Data

May 27, 2005 (FR) ..................................... 0505414

(51) Int. Cl.
*C01B 33/193* (2006.01)

(52) U.S. Cl.
CPC .................................. *C01B 33/193* (2013.01)

(58) Field of Classification Search
CPC ..................................................... C01B 33/193
See application file for complete search history.

(56) References Cited

U.S. PATENT DOCUMENTS

| 4,256,682 A ‡ | 3/1981 | Denton ..................... B01J 21/08 |
| | | 423/338 |
| 5,616,316 A ‡ | 4/1997 | Persello ................... A61K 8/25 |
| | | 106/35 |
| 5,968,470 A * | 10/1999 | Persello ................ C01B 33/193 |
| | | 423/339 |
| 7,799,304 B2 * | 9/2010 | Dromard ............. H01M 50/443 |
| | | 423/339 |
| 2004/0079504 A1‡ | 4/2004 | Lafon et al. ........... D21H 17/69 |
| | | 162/181.6 |
| 2005/0074386 A1‡ | 4/2005 | Valero et al. ......... C01B 33/193 |
| | | 423/338 |

\* cited by examiner
‡ imported from a related application

*Primary Examiner* — Shuangyi Abu Ali
(74) *Attorney, Agent, or Firm* — Osha Bergman Watanabe & Burton LLP

(57) ABSTRACT

The invention relates to the use of carboxylic acid during the preparation of precipitated silica or a suspension of precipitated silica and to the precipitated silicas thus obtained, particularly with low water uptake, which can be used, for example, as a reinforcing filler in silicon matrices.

13 Claims, No Drawings

PREPARATION OF PRECIPITATED SILICAS USEFUL AS FILLERS IN SILICON MATRICES

The present application is a divisional application of U.S. application Ser. No. 11/921,073, filed on Nov. 27, 2007, which is a U.S. national stage entry under 35 U.S.C. § 371 of International Application No. PCT/FR2006/001207 filed on May 29, 2006, which claims priority to French Application No. 0505414 filed on May 27, 2005.

The present invention relates to the use of carboxylic acid during the preparation of precipitated silica or of a precipitated silica suspension, to a process for the preparation of a precipitated silica or of a precipitated silica suspension, and to the precipitated silicas and to the precipitated silica suspensions thus obtained.

It also relates to a specific precipitated silica with a low water uptake and to its process of preparation.

It also relates to the uses of these precipitated silicas, in particular those having a low water uptake, in particular as filler in matrices based on silicone(s), for example intended for the coating of electric cables.

It is desired to produce precipitated silicas which can be used as reinforcing filler in silicone matrices, in particular precipitated silicas with a low water uptake.

Thus, while pyrogenic silicas, which exhibit a low affinity with water, have been employed for many years as reinforcing filler in matrices based on silicone(s), for example compositions of silicone elastomer or silicone paste type, these pyrogenic silicas are in particular expensive due to their method of preparation.

Consequently, attempts have been made for several years to at least partially replace, in applications for the reinforcing of silicone matrices, these expensive pyrogenic silicas with cheaper precipitated silicas.

However, it turns out that precipitated silicas do not often exhibit good reinforcing properties for silicone matrices. Their compatibility with the silicone matrices in which they are incorporated is not always satisfactory. In addition, they have, for example, rather a tendency to exhibit a high affinity with water, which constitutes a disadvantage in the context of use in the reinforcing of silicone matrices. Generally, the affinity of a silica with regard to water is illustrated by its water uptake characteristic, which reflects the more or less marked tendency which water molecules exhibit to be adsorbed on its surface. Precipitated silicas often exhibit a high affinity for water due in particular to the presence on their surface of water-greedy Si—OH groups.

One of the aims of the invention is in particular to provide an alternative to known processes for the preparation of precipitated silicas which is economical and simple to implement and which preferably makes it possible to obtain precipitated silicas which can be used as fillers, in particular as reinforcing fillers, in matrices based on silicone(s), on which they can preferably confer good optical and/or mechanical properties.

A subject matter of the present invention is in particular the use of carboxylic acid, preferably water-soluble carboxylic acid, during the preparation of precipitated silica or of a precipitated silica suspension (in particular an aqueous suspension), in which the carboxylic acid is mixed with or added to the filtration cake resulting from the reaction for the precipitation of the silica, before or during the disintegration operation to which the filtration cake is subjected, the mixture obtained subsequently being optionally dried.

Generally, precipitated silica is prepared by a precipitation reaction of a silicate, such as an alkali metal silicate (for example sodium silicate), with an acidifying agent (for example sulfuric acid), then separation by filtration of the precipitated silica obtained, with a filtration cake being obtained, subsequent disintegration of said filtration cake and, finally, drying (generally by atomization). Any form of precipitation of the silica can be employed: in particular, addition of acidifying agent to a silicate vessel heel, complete or partial simultaneous addition of acidifying agent and of silicate to a vessel heel formed of water or of silicate.

The use targeted by the invention is not that of a carboxylic acid as acidifying agent with regard to the precipitation reaction nor that of a carboxylic acid during a simple optional stage of washing the filtration cake.

According to the invention, the filtration cake is subjected to a disintegration operation and the carboxylic acid is mixed with or added to said cake before this disintegration operation or, preferably, during this disintegration operation. In the case of the preparation of precipitated silica, the mixture then obtained (precipitated silica suspension) is subsequently dried (generally by atomization).

The disintegration operation is a fluidification or liquefaction operation in which the filtration cake is rendered liquid, in this instance in the presence of carboxylic acid, the precipitated silica being reencountered in suspension. This operation can thus be carried out by subjecting the filtration cake to a chemical action by addition of carboxylic acid, optionally coupled to a mechanical action (for example by passing through a mill of colloid type). The suspension (in particular aqueous suspension) obtained after disintegration exhibits a relatively low viscosity.

An inorganic acid or an aluminum-based compound (aluminum aluminate type) can optionally be used, in addition to the carboxylic acid, during the disintegration operation. However, advantageously, no inorganic acid and no aluminum-based compound (sodium aluminate type) are employed during the disintegration operation.

Specifically, the invention relates to the use of carboxylic acid as fluidification agent for the filtration cake.

The use of carboxylic acid can make it possible to improve the properties of the precipitated silica as filler, in particular reinforcing filler, in solid matrices, such as matrices based on silicone(s) or matrices based on polyamide(s).

The carboxylic acid is preferably chosen from maleic acid, formic acid, octanoic acid, acetic acid, oxalic acid, propionic acid or succinic acid.

It can in particular be chosen from maleic acid, formic acid, octanoic acid, propionic acid or succinic acid.

The present invention also relates to a process for the preparation of a precipitated silica or of a precipitated silica suspension, in which:
- at least one silicate is reacted with at least one acidifying agent, so as to obtain a precipitated silica suspension,
- the precipitated silica suspension obtained is filtered,
- the filtration cake obtained on conclusion of the filtration is subjected to a disintegration operation,
- characterized in that the filtration cake is mixed with or has added to it, before or during the disintegration operation, at least one carboxylic acid, preferably a water-soluble carboxylic acid, the mixture obtained subsequently, in the case of the preparation of a precipitated silica, being dried (generally by atomization).

Likewise, the filtration cake is subjected to a disintegration operation and carboxylic acid is mixed with or added to said cake before this disintegration operation or, preferably, during this disintegration operation. In the case of the preparation of precipitated silica, the mixture then obtained (precipitated silica suspension) is subsequently dried (generally by atomization).

The disintegration operation is a fluidification or liquefaction operation in which the filtration cake is rendered liquid, in this instance in the presence of carboxylic acid, the precipitated silica being reencountered in suspension. This operation can thus be carried out by subjecting the filtration cake to a chemical action by addition of carboxylic acid, optionally coupled to a mechanical action (for example by passing through a mill of colloid type). The suspension (in particular aqueous suspension) obtained after disintegration exhibits a relatively low viscosity.

Advantageously, no other acid (in particular inorganic acid) and no aluminum-based compound (sodium aluminate type) are employed here during the disintegration operation.

Likewise, the carboxylic acid is preferably chosen from maleic acid, formic acid, octanoic acid, acetic acid, oxalic acid, propionic acid or succinic acid.

It can in particular be chosen from maleic acid, formic acid, octanoic acid, propionic acid or succinic acid.

In the invention, the filtration cake can optionally be washed.

The invention also relates to the precipitated silica suspensions resulting from the use described above and to the precipitated silica suspensions obtained or capable of being obtained by the process according to the invention.

The invention also relates to the precipitated silicas resulting from the use described above and to the precipitated silicas obtained or capable of being obtained by the process according to the invention, it being possible for these silicas optionally to have been milled.

The amount of carboxylic acid employed is generally such that these precipitated silicas usually exhibit a content of carboxylic acid+corresponding carboxylate (that is to say, carboxylate resulting from said carboxylic acid), expressed as carbon (organic), of at least 0.02% by weight, preferably of at least 0.03% by weight, especially of at least 0.04% by weight, in particular of at least 0.05% by weight, for example of at least 0.10% by weight.

This content can be at least 0.20% by weight, especially at least 0.30% by weight, in particular at least 0.40% by weight, indeed even at least 0.50% by weight.

The content of carboxylic acid+corresponding carboxylate, expressed as carbon, can be measured using a Leco CS 444 analyzer. The principle of the measurement method is generally as follows:
oxidation of the silica in the presence of catalyst in an induction oven while flushing with oxygen;
detection and integration of the CO 2 peaks by infrared spectrometry.

Generally, beforehand, the silica is pelletized (pressure of 10 tonnes/cm 2) and heat treated at 160° C. for 5 minutes.

These precipitated silicas according to the invention generally exhibit, at their surface, molecules of the carboxylic acid employed and/or of the carboxylate corresponding to the carboxylic acid employed.

This presence of carboxylic acid in the acid form and/or in the carboxylate form can be determined by infrared (in particular by ATR-diamond analysis on the silica using, for example, a Bruker IFS 66 spectrometer).

The subject matter of the present invention is in particular a precipitated silica (referred to as S in the continuation of the account), characterized in that it has:
a water uptake of less than 6% and preferably of greater than 3%, in particular of between 4.5 and 5.8%,
a level of residual anion, expressed as alkali metal sulfate (in particular sodium sulfate), of less than 1% by weight, advantageously of less than 0.5% by weight, preferably of less than 0.25% by weight, especially of at most 0.20% by weight,
a content of carboxylic acid+corresponding carboxylate, expressed as carbon (organic), of at least 0.02% by weight, preferably of at least 0.03% by weight, especially of at least 0.04% by weight, more particularly of at least 0.05% by weight, in particular of at least 0.10% by weight, for example of at least 0.30% by weight, indeed even of at least 0.40% by weight or of at least 0.50% by weight.

The principle of the method for measuring the water uptake consists generally in placing the predried sample of silica under given relative humidity conditions for a predefined period of time; the silica then hydrates, which causes the weight of the sample to change from a starting value w (in the dried state) to a final value w+dw. "Water uptake" of a silica specifically denotes, in particular throughout the continuation of the account, the dw/w ratio (that is to say, the weight of water incorporated in the sample with respect to the weight of the sample in the dry state), expressed as percentage, calculated for a silica sample subjected to the following conditions during the measurement method:
preliminary drying: 8 hours at 105° C.;
hydration: 24 hours at 20° C. under a relative humidity of 70%.

The experimental protocol employed consists in successively:
exactly weighing approximately 2 g of the test silica;
drying the silica thus weighed for 8 hours in an oven adjusted to a temperature of 105° C.;
determining the weight w of the silica obtained on conclusion of this drying operation;
placing the dried silica in a closed container, such as a desiccator, containing a water/glycerol mixture, so that the relative humidity of the closed medium is 70%, for 24 hours at 20° C.;
determining the weight (w+dw) of the silica obtained subsequent to this treatment for 24 hours at 70% relative humidity, this weight being measured immediately after having removed the silica from the desiccator, so as to avoid a variation in the weight of the silica under the influence of the change in hygrometry between the medium at 70% relative humidity and the atmosphere of the laboratory.

The carbon content can be determined according to the method set out above.

Preferably, the precipitated silica S according to the invention generally exhibits, at its surface, molecules of carboxylic acid and/or molecules of the carboxylate corresponding to a carboxylic acid. Preferably, said carboxylic acid is maleic acid, formic acid, octanoic acid, acetic acid, oxalic acid, propionic acid or succinic acid. More preferably still, said carboxylic acid is maleic acid, formic acid, octanoic acid, propionic acid or succinic acid.

This presence of carboxylic acid in the acid form and/or in the carboxylate form can be determined by infrared (in particular as described above).

The precipitated silica S according to the invention generally exhibits a CTAB specific surface of between 50 and 260 m$^2$/g, preferably between 110 and 240 m$^2$/g, more preferably still between 130 and 220 m$^2$/g, especially between 145 and 210 m$^2$/g, in particular between 150 and 200 m²/g; this CTAB specific surface can be between 155 and 195 m²/g, for example between 160 and 195 m²/g or between 170 and 190 m²/g.

The CTAB specific surface is the external surface determined according to standard NFT 45-007 (November 1987).

The precipitated silica. S according to the invention preferably has a DOP oil uptake of greater than 300 ml/100 g, more preferably still of greater than 310 ml/100 g, especially of between 315 and 450 ml/100 g, in particular between 315 and 400 ml/100 g, for example between 320 and 380 ml/100 g, indeed even between 340 and 380 ml/100 g.

The DOP oil uptake is determined according to standard ISO 787/5, dioctyl phthalate being employed.

The precipitated silica S has, according to a preferred alternative form of the invention, a mean particle size or a median particle diameter of less than 30 µm, more preferably still of less than 20 µm, especially of between 5 and 15 µm, in particular between 8 and 13 µm.

According to another alternative form of the invention, the precipitated silica S has a mean particle size or a median particle diameter of between 30 µm and 20 mm.

The mean size of the silica particles can be determined according to standard NF X 11507 (December 1970) by dry sieving and determining the diameter corresponding to a cumulative oversize of 50%.

The median diameter of the silica particles can be determined by laser diffraction according to standard NF X 11-666. The particle sizer used is of the Malvern Mastersizer type. The measurement criteria are as follows:
 optical concentration: 12±2%
 measurement liquid: degassed demineralized water
 absence of ultrasound
 absence of dispersant
 duration of the measurement: 10 seconds The precipitated silica S according to the invention preferably exhibits a pH of between 3.5 and 7.5, more preferably still between 4 and 7, especially between 4.5 and 6.

The pH of the silica is measured according to standard ISO 787/9 (pH of a 5% by weight suspension of silica in deionized water).

The precipitated silica S according to the invention generally exhibits a median diameter d50 of the particles, after deagglomeration under ultrasound, of at most 35 µm, preferably of at most 30 µm, very particularly of at most 25 µm, in particular of at most 15 µm, for example of at most 10 µm.

The median diameter d50 of the silica after deagglomeration under ultrasound is measured using the Malvern Mastersizer particle sizer according to the following test:

The power of the ultrasound in the Malvern Mastersizer particle sizer being adjusted to the maximum graduation of 20, an amount of silica is introduced so as to obtain an optical concentration of 12±2%.

The median diameter d50 and the percentage of silica particles with a diameter of greater than 51 µm are measured after having kept the vessel subjected to ultrasound for 60 seconds, the vessel being homogenized by circulation of the suspension using a centrifugal pump. The measurement is recorded 10 seconds after ceasing to apply ultrasound.

The ability of the silica according to the invention to disperse or to deagglomerate can also be assessed by a particle size measurement (by laser diffraction) carried out on a suspension of silica deagglomerated beforehand by ultrasonication (splitting of the objects from 0.1 to a few tens of microns). The deagglomeration under ultrasound is carried out using a Vibracell Bioblock (600 W) ultrasound generator equipped with a probe with a diameter of 19 mm.

The particle size measurement is carried out by laser diffraction on a Sympatec particle sizer.

2 grams of silica are weighed out into a sample tube (height: 6 cm and diameter: 4 cm) and are made up to 50 grams by addition of deionized water: a 4% aqueous silica suspension is thus produced and is homogenized for 2 minutes with magnetic stirring. Deagglomeration is subsequently carried out under ultrasound as follows: the probe being immersed over a length of 4 cm, the output power is adjusted so as to obtain a deviation of the needle of the power dial indicating 20%. Deagglomeration is carried out for 420 seconds. The particle size measurement is subsequently carried out by introducing, into the vessel of the particle sizer, a volume V (expressed in ml) of the homogenized suspension necessary in order to obtain an optical density of the order of 20.

A deagglomeration factor $F_D$ is then given by the equation:

$F_D = 10 \times V$/optical density of the suspension measured by the particle sizer (this optical density is approximately 20).

This deagglomeration factor F D is indicative of the level of particles with a size of less than 0.1 µm which are not detected by the particle sizer. This factor increases as the aptitude for deagglomeration exhibited by the silica increases.

The value of the median diameter $Ø_{50}$ which is obtained according to this test decreases as the aptitude for deagglomeration exhibited by the silica increases.

Generally, the precipitated silica S according to the invention has a median diameter $Ø_{50}$, after deagglomeration under ultrasound, of less than 6 µm, in particular of less than 5 µm, for example of less than 3.5 µm.

The precipitated silica S according to the invention usually has an ultrasound deagglomeration factor F D of greater than 5.5 ml, in particular greater than 7.5 ml, for example greater than 11.5 ml.

The precipitated silica S according to the invention usually has a BET specific surface such that the BET specific surface-CTAB specific surface difference is at most 60 m²/g, preferably at most 30 m²/g, especially at most 20 m²/g, for example at most 10 m²/g.

The BET specific surface is determined according to the Brunauer-Emmett-Teller method described in the Journal of the American Chemical Society, vol. 60, page 309, February 1938, corresponding to standard NFT 45007 (November 1987).

Furthermore, the precipitated silica S according to the invention can exhibit a packing density, measured according to standard ISO 787/11, of at most 0.3 g/ml, preferably of 0.04 to 0.3 g/ml, especially of 0.05 to 0.3 g/ml, in particular of 0.05 to 0.2 g/ml; this packing density can also be between 0.1 and 0.3 g/ml, in particular between 0.1 and 0.27 g/ml, especially between 0.15 and 0.25 g/ml.

The loss on ignition (LOI) of the precipitated silica S according to the invention, measured according to standard ISO 3262/11, after treatment at 1000° C., is generally such that the difference between the LOI and the water content is less than 3.2%, preferably less than 3%, very particularly less than 2.7%.

The water content is the residual water content measured according to standard ISO 787/2, after heat treatment at 105° C. for 2 hours.

The water content of the precipitated silica S according to the invention, in particular when it is intended to be used as filler in silicone matrices, is generally less than. 5%, preferably less than 4%, in particular at most 3.5%, especially at most 3.0%, of the total weight of the sample. It can be at most 2.0%, for example at most 1.5% or at most 1.0%, of the total weight of the sample.

The precipitated silica S according to the invention can additionally exhibit a level of transmission of at least 70% at a refractive index in glycerol lying between 1.450 and 1.467.

The refractive index under consideration is that corresponding to the most transparent suspension (maximum transmission) of this silica in various water-glycerol solutions, which transparency is determined by the transmission at 589 nm with a spectrophotometer. Each suspension is obtained by dispersing 2 g of silica in 18 g of water/glycerol solution and then deaerating under a slight vacuum before reading the transmission (reading carried out with the silica-free water/glycerol solution as reference product) on the spectrophotometer and the refractive index on a refractometer.

The silica according to the invention can be provided in the form of beads, of granules (or other aggregates) or, preferably, of a powder.

Another specific subject matter of the present invention is a process for the preparation of a precipitated silica, especially of the precipitated silica S, characterized in that it comprises the following successive stages:
(a) a starting aqueous vessel heel with a temperature of between 80 and 100° C., for example between 90 and 100° C., is formed which comprises a silicate and, for example, water, the concentration of silicate in said starting vessel heel, expressed as $SiO_2$ equivalent, being less than or equal to 15 g/l,
(b) an acidifying agent is added to said starting vessel heel, at a temperature of between 80 and 100° C., for example between 90 and 100° C., so as to bring the pH of the reaction medium to a value of between 7 and 8, preferably of between 7.2 and 7.8, advantageously between 7.3 and 7.7 (typically to a value substantially equal to 7.5),
(c) a silicate and an acidifying agent are added, preferably simultaneously, to the medium thus produced, at a temperature of between 80 and 100° C., for example between 90 and 100° C., the respective amounts of silicate and of acidifying agent added over time being chosen so that, throughout the duration of the addition:
the pH of the reaction medium remains between 7 and 8, preferably between 7.2 and 7.8, advantageously between 7.3 and 7.7, and
the concentration of silicate in the medium, expressed as $SiO_2$ equivalent, is less than or equal to 35 g/l,
(d) an acidifying agent is added to the medium obtained, at a temperature of between 80 and 100° C., for example between 90 and 100° C., so as to bring the pH of the medium to a value of between 3 and 6.5,
(e) the suspension (in particular aqueous suspension) of silica obtained is filtered,
(f) the filtration cake obtained on conclusion of the filtration (e) is dried, preferably by atomization,
said process being characterized in that, prior to the drying thereof in stage (f), the filtration cake is mixed with or has added to it at least one carboxylic acid, preferably a water-soluble carboxylic acid, and in that the filtration cake thus obtained exhibits, prior to the drying thereof in stage (f), a loss on ignition at 1000° C. of greater than 80% by weight._. (especially of between 81 and 90% by weight, for example between 83 and 87% by weight), preferably of greater than 82% by weight, especially of at least 83% by weight, in particular of between 84 and 90% by weight, indeed even of at least 85% by weight, for example between 85 and 88% by weight.

Generally, this process according to the invention also comprises the following stage:
(g) the silica obtained on conclusion of stage (f) is milled or micronized.

Very preferably, the filtration cake obtained on conclusion of the filtration (e) is subjected, prior to the drying thereof in stage (f), to a disintegration operation, the carboxylic acid being mixed with or added to said cake before this disintegration operation or, advantageously, during this disintegration operation.

The disintegration operation is a fluidification or liquefaction operation in which the filtration cake is rendered liquid, in this instance in the presence of carboxylic acid, the precipitated silica being reencountered in suspension. This operation can thus be carried out by subjecting the filtration cake to a chemical action by addition of carboxylic acid, optionally coupled to a mechanical action (for example by passing through a mill of colloid type). The suspension (in particular aqueous suspension) obtained after disintegration exhibits a relatively low viscosity.

An inorganic acid or an aluminum-based compound (aluminum aluminate type) can optionally be used, in addition to the carboxylic acid, during the disintegration operation. However, advantageously, no inorganic acid and no aluminum-based compound (sodium aluminate type) are employed during the disintegration operation.

The carboxylic acid is preferably chosen from acetic acid, formic acid, maleic acid, octanoic acid, oxalic acid, propionic acid or succinic acid.

The silicates introduced in stages (a) and (c) of the process can be chosen from all the common forms of silicates. Advantageously, the silicates used according to the invention are alkali metal silicates, such as, for example, sodium or potassium silicates.

Particularly preferably, the silicate of stage (a) is a sodium silicate, as well as that added during stage (c). The sodium silicate employed is then generally characterized by an $SiO_2/Na_2O$ ratio by weight of between 2 and 4, advantageously between 3 and 3.6, this $SiO_2/Na_2O$ ratio by weight preferably being between 3.3 and 3.5.

The vessel heel formed in stage (a) is generally provided in the form of an aqueous silicate solution, the concentration of silicate, expressed as $SiO_2$ equivalent, of which is characteristically less than or equal to 15 g/l. Typically, the concentration of silicate in the vessel heel of stage (a), expressed as $SiO_2$ equivalent, is between 1 and 15 g/l. This concentration of silicate in the vessel heel of stage (a), expressed as $SiO_2$ equivalent, is advantageously less than or equal to 12 g/l, in particular less than or equal to 11 g/l, for example at most 10.5 g/l, indeed even at most 10 g/l or at most 9 g/l.

The vessel heel of stage (a) generally has a pH of the order of 9 to 13.

Stage (b) of the process of the invention consists specifically in reducing this value of the pH by addition of an acidifying agent, so as to bring the pH of the medium within the range from 7 to 8 (preferably between 7.2 and 7.8, advantageously from 7.3 to 7.7), where it has been demonstrated that the reaction for the precipitation of the silica takes place in optimum fashion. The term "acidifying agent" is understood to mean any inorganic or organic acidic compound capable of being able to lead to a reduction in the pH of the vessel heel. Thus, use may advantageously be made, as acidifying agent, of an inorganic acid, such as sulfuric acid, hydrochloric acid or nitric acid.

Advantageously, no electrolyte is added during the process, in particular in stage (a). The term "electrolyte" is to be understood here as normally accepted, that is to say that it denotes any ionic or molecular substance which, when it is in solution, decomposes or dissociates to form ions or charged particles (the usual electrolytes are alkali metal and alkaline earth metal salts, in particular the salt of the starting silicate metal and of the acidifying agent, such as sodium chloride in the case of the reaction of a sodium silicate with hydrochloric acid or sodium sulfate in the case of the reaction of a sodium silicate with sulfuric acid).

The acidifying agent employed in stage (b) of the process is preferably sulfuric acid, in particular when the silicate present in the starting vessel heel is an alkali metal silicate. Generally, the acidifying agent of stage (b) is most often introduced in the form of an aqueous solution, preferably a dilute aqueous solution, generally with a normality of between 0.25 and 8N. Thus, in stage (b), the reduction in the pH of the medium can advantageously be carried out by addition of an aqueous sulfuric acid solution with a concentration of between 10 and 3.50 g/l and preferably between 50 and 250 g/l.

Whatever the exact nature of the acidifying agent of stage (b), this acidifying agent must be employed so that its addition results in a reduction in the pH of the medium down to a value of between 7 and 8, preferably between 7.2 and 7.8, advantageously between 7.3 and 7.7 (typically to a value substantially equal to 7.5). The amount of acidifying agent to be employed in this context is generally determined in practice by measuring the change in the pH during the addition, the addition of the acidifying agent of stage (b) being continued until the pH reaches the desired value.

Furthermore, the addition of stage (b) is preferably carried out gradually, that is to say advantageously, as a general rule, with an addition time of between 3 and 70 minutes, in particular between 5 and 60 minutes, preferably at least equal to 10 minutes. This addition time can be less than 30 minutes.

According to a specific embodiment which can be envisaged for stage (b), this stage can include a maturing process which, if appropriate, is carried out by leaving the medium to change for a period of time generally of between 5 and 30 minutes, for example at a temperature of between 90 and 100° C., it being understood that, subsequent to this maturing, the pH of the reaction medium is adjusted if necessary, in particular by addition of an acidifying agent, so that, on conclusion of stage (b), the pH of the medium lies within the pH range between 7 and 8 and advantageously within the abovementioned preferred ranges.

Subsequent to stage (b), by which the pH of the reaction medium is brought within the region from 7 to 8, preferably from 7.2 to 7.8, advantageously from 7.3 to 7.7. (and typically to a value substantially equal to 7.5), stage (c) of the process consists in continuing the operation for the precipitation of silica by introducing additional silicate and by specifically maintaining the pH of the medium within the region between 7 and 8, preferably between 7.2 and 7.8, advantageously between 7.3 and 7.7, preferably at a substantially constant value, this constant value then being substantially equal to 7.5.

Preferably, stage (c) of the process of the invention is carried out immediately after obtaining, for the medium, the desired pH in stage (b).

The addition of the silicate and of the acidifying agent which is carried out during stage (c) can consist of a continuous addition of silicate to the medium, during which the pH of the medium is measured and during which the value of this pH is regulated by introduction of the acidifying agent, it being possible, for example, for this introduction of the acidifying agent to be carried out as soon as the pH of the medium becomes greater than a control value of between 7 and 8, this control value generally being set in the vicinity of 7.5. By this means, success is achieved in maintaining, in the medium, a substantially constant value of the pH, that is to say advantageously varying to +/−0.2 pH unit (preferably to +/−0.1 pH unit) around a set value, generally of between 7.3 and 7.7.

Alternatively, the addition carried out during stage (c) can also consist of a continuous addition of acidifying agent to the medium, the pH then being regulated during the addition by introduction of the silicate, it being possible here again for this introduction of the silicate to be, for example, carried out as soon as the pH of the medium becomes less than a control value of between 7 and 8, generally set in the vicinity of 7.5. By this means, success is also achieved in keeping the medium at a substantially constant pH, that is to say advantageously varying to +/−0.2 pH unit (preferably to +/−0.1 pH unit) around a set value, generally of between 7.3 and 7.7.

According to yet another embodiment which can be envisaged (preferred embodiment), the addition carried out during stage (c) can consist of a continuous simultaneous addition both of acidifying agent and of silicate with concentrations and flow rates calculated so that, throughout the duration of the addition, the pH of the medium remains between 7 and 8 and preferably between 7.2 and 7.8. In this case, the pH of the medium generally has a tendency to change during stage (c) while remaining within the abovementioned range but it can, in some cases, remain substantially equal to a constant value advantageously of the order of 7.5. In this context, it is generally preferable for, throughout stage (c), the instantaneous flow rates corresponding to the amount of silicate functional groups (expressed as molar equivalent of NaOH) introduced per second (recorded as d s) and the amount of acid functional groups (as moles) introduced per second (recorded as d A) to be such that the ratio $d_S/d_A$ remains continuously between 1.01 and 1.09 and preferably between 1.02 and 1.07.

Whatever the exact embodiment of stage (c), the silicate and the acidifying agent used are generally identical to those employed in stages (a) and (b). Thus, the silicate of stage (c) is preferably an alkali metal silicate, advantageously a sodium silicate, and the acidifying agent is preferably a strong inorganic acid, generally sulfuric acid.

Insofar as, during the addition carried out in stage (c), the concentration of silicate in the medium. (expressed as $SiO_2$ equivalent) characteristically has to be kept below or equal to 35 g/l, the silicate introduced into the reaction medium during stage (c) is generally in the form of a dilute aqueous solution, that is to say with a concentration, expressed as $SiO_2$ equivalent, advantageously of between 10 and 360 g/l, preferably of less than 300 g/l and advantageously of less than 270 g/l, this being very particularly the case when alkali metal silicates, such as sodium silicates, are used. In the same way, the acidifying agent is generally in the form of a dilute aqueous solution which generally has a normality of between 0.25 and 8N and preferably between 0.5 and 4N. Thus, in the specific case of the use of an aqueous sulfuric acid solution as acidifying agent of stage (c), for example, the concentration of the solution is advantageously between 25 and 380 g/l and preferably between 50 and 300 g/l.

In view of the use of dilute concentrations in the medium for the precipitation of the silicas, the concentrations of salts in this medium, in particular related to the reaction of the silicate and of the acidifying agent, are low, which is reflected by a weak ionic strength within the precipitation medium employed.

So as to further improve the control of the formation of the silica, it can be particularly advantageous to carry out the addition of stage (c) with silicate and acidifying agent flow rates which are relatively low, that is to say generally with an addition time of stage (c) preferably of between 15 and 300 minutes and preferably between 30 and 100 minutes. This is because such addition times generally result in the production of silica particles exhibiting low levels of surface Si—OH groups.

Generally, stage (c) of the process of the invention is carried out with stirring at a temperature of between 80 and 100° C. and generally at the same temperature as the addition carried out during stage (b). Thus, the operating temperature of stage (c) can advantageously be between 90 and 100° C. and it is preferably of the order of 95° C.

According to a specific alternative form (not preferred) of the process according to the invention, this applying in particular with regard to the preparation of silicas which can be used in applications other than food, dentifrice, cosmetic or pharmaceutical applications, it is optionally possible to introduce, into the reaction medium, during stage (c), for example at the end of this stage (that is to say, typically during the period corresponding to the final quarter of this stage, generally during the final 5 to 15 minutes of this stage), an aluminum salt of acidic nature, such as an aluminum sulfate. The amount of aluminum compound introduced in this context is generally such that, within the reaction medium, the $Al/SiO_2$ ratio is between 0.1 and 1% by weight, this ratio being in particular at most equal to 0.6%, for example less than or equal to 0.5%.

Whatever the exact embodiment of stage (c), the reaction medium is, on conclusion of this stage, specifically at a pH of between 7 and 8, preferably between 7.2 and 7.8, advantageously between 7.3 and 7.7 (typically substantially equal to 7.5).

Depending on the applications envisaged for the silica, stage (d) of acidification of the medium in the pH region from 3 to 6.5 can be varied by the amount of acidifying agent added. Preferably, the pH of the medium reached on conclusion of stage (d) is between 3.1 and 5.5.

The acidifying agent of stage (d) can be identical to or different from that or those employed in stages (b) and (c). Preferably, this acidifying agent of stage (d) is introduced into the medium in the form of an aqueous solution with a normality of between 0.25 and 8N. Advantageously, it is an aqueous sulfuric acid solution generally at a concentration of between 25 and 380 g/l, if appropriate.

Stages (a), (b), (c) and/or (d) of the process according to the invention can be carried out at a temperature of between 90 and 100° C., in particular at a temperature of between 93 and 97° C., for example at a temperature substantially equal to 95° C. throughout the process.

Stages (a), (b), (c) and/or (d) of the process according to the invention are generally carried out with stirring.

According to an advantageous alternative form of the process of the invention, the or one of the silica suspensions or dispersions (in particular aqueous) obtained on conclusion of stages (c) and (d) can be subjected to a maturing stage generally carried out, if appropriate, by leaving the medium, preferably with stirring, at a temperature of between 90 and 100° C. for a period of time which can advantageously be between 2 and 240 minutes, for example for a period of time of greater than 30 minutes, the temperature during the maturing preferably being substantially constant (if appropriate, advantageously substantially equal to 95° C.) or else increasing (generally stepwise, if appropriate) within the temperature range extending from 90 to 100° C.

The addition of an aluminum salt of acidic nature, such as an aluminum sulfate, which can be envisaged in stage (c) can also be carried out during stage (d) or alternatively during the optional subsequent maturing stage. Thus, generally, this addition of an aluminum salt of acidic nature, such as an aluminum sulfate, to the medium can take place between stage (c) and stage (e), even if this does not constitute a preferred embodiment.

Generally, during this stage (e), the suspension obtained on conclusion of stage (d) and of the optional following maturing stage is filtered through a filter press or is filtered under vacuum using a rotary filter, a belt filter or a flat filter, this filtration resulting in a silica filtration cake being obtained.

The filtration cake is, optionally after washing, generally with water, subjected in stage (f) to a drying operation, preferably by appropriate atomization, for example using a nozzle (in particular liquid pressure or two-fluid) atomizer or, preferably, a rotary atomizer.

Prior to the drying thereof in stage (f), the filtration cake is mixed with at least one carboxylic acid, preferably a water-soluble carboxylic acid, and the filtration cake thus obtained exhibits, prior to the drying thereof in stage (f), a loss on ignition at 1000° C. of greater than 80% by weight (especially of between 81 and 90% by weight, for example between 83 and 87% by weight), preferably of greater than 82% by weight, especially of at least 83% by weight, in particular of between 84 and 90% by weight, indeed even of at least 85% by weight, for example between 85 and 88% by weight.

The dried silicas obtained on conclusion of stage (f) can optionally be subjected to a stage of agglomeration, in particular by direct compression, by wet granulation (that is to say, with use of a binder, such as water), by extrusion and, preferably, by dry compacting. When the latter technique is employed, it can prove to be advantageous, before carrying out the compacting, to deaerate (operation also referred to as predensifying or degassing) the pulverulent products so as to remove the air included in the latter and to provide more uniform compacting. On conclusion of the agglomeration stage, the products can be graded to a desired size, for example by sieving. The compacted precipitated silica capable of being obtained is then instead provided in the form of granules. If appropriate, these granules can be provided in the most diverse shapes. The shapes which may be especially mentioned by way of example are spherical, cylindrical, parallelepipedal, tablet, flake, pellet and extrudate of circular or polylobar section. The mean dimensions of these granules are, for example, between 2 and 20 mm.

Generally, the precipitated silica obtained on conclusion of stage (f) and then optionally agglomerated is subsequently micronized or, preferably, milled.

Micronizing can be carried out with a micronizer, such as an air jet mill.

Milling can be carried out in particular using a mechanical mill, for example of the ACM, Forplex, type, in particular a classifier hammer mill.

The precipitated silicas according to the present invention, in particular the precipitated silicas S, or (capable of being) obtained by the process according to the invention described above exhibit a very good aptitude for dispersing, in particular within solid matrices or media, of the type consisting of matrices based on silicone(s), matrices based on elastomer(s), in particular clear or semi-clear elastomer (s), matrices based on polyamide(s) or various pastes. This is reflected by a good reinforcing and/or thickening power. They generally exhibit a low affinity with regard to water.

They are suitable for use as filler, especially reinforcing filler, in matrices based on silicone(s), in particular high temperature or room temperature vulcanizable silicone elastomer matrices, on which they confer good optical properties, while providing them, preferably, with highly satisfactory mechanical and/or rheological properties.

This is because they find an advantageous application in the reinforcing of high temperature vulcanizable pasty or elastomeric organosilicon compositions (matrices) (HTV silicones, for example) or room temperature vulcanizable pasty or elastomeric organosilicon compositions (matrices) intended in particular for an insulation role, such as the coating of electric cables. Said silicone-based matrices, in particular those intended for an insulation role, can be formed by extrusion, before being crosslinked. The low value for water uptake of the silicas of the invention makes it possible to avoid or to limit the formation of bubbles, in particular during the extrusion. These silicone-based matrices can also be formed by molding. The silicas according to the invention advantageously confer, on the silicone matrices, very good electrical and mechanical properties, in particular with regard to tear strength, ultimate strength, indeed even compression set, and also excellent optical properties (in particular with regard to whiteness and transparency).

The nature of the vulcanizable organopolysiloxane or organopolysiloxanes present in this type of composition and that of the vulcanizing agents and other additives optionally present, as well as the vulcanizing conditions, are well known to a person skilled in the art; they are described in particular in application WO 03/055801.

The amount of precipitated silica which can be employed for the reinforcing of said matrices based on silicones can range from 3 to 20% when silicone pastes are concerned or from 5 to 50%, preferably from 10 to 40%, when a composition of elastomeric nature is concerned.

The precipitated silicas according to the present invention, in particular the precipitated silicas S, or (capable of being) obtained by the process according to the invention described above can also be employed as reinforcing filler in a matrix based on elastomer(s), especially clear or semi-clear elastomer(s), for shoe soles. They can make possible strong reinforcing of the transparent or translucent matrices used for the preparation of components made of transparent or translucent rubber which are constituents of shoe soles. They can make it possible to obtain reinforced matrices having very good transparency. The amount of precipitated silica which can be used in this type of matrix is generally between 10 and 50%, in particular between 20 and 40%, with respect to the weight of elastomer(s).

The precipitated silicas according to the present invention, in particular the precipitated silicas S, or (capable of being) obtained by the process according to the invention described above can also be employed, for example, as reinforcing filler in matrices based on polyamide(s) or as filler in cement or concrete compositions.

A possible application of the precipitated silicas according to the present invention, in particular the precipitated silicas S, or (capable of being) obtained by the process according to the invention described above lies in their use as carrier for liquids, in particular due to their good absorption capacity and a highly satisfactory flowability.

Mention may be made, as liquids, of organic liquids, such as organic acids, surface-active agents, for example of anionic or nonionic type, organic additives for rubber/polymers, or pesticides.

Preferably, use is made here, as liquids, in particular of liquid additives, such as flavorings, colorants, liquid food supplements (in particular for the feeding of animals (for example vitamin. E, vitamin E acetate or choline hydrochloride)) or preservatives, preferably carboxylic acids (propionic acid, for example).

The conditioned compositions comprising at least one liquid absorbed on a carrier formed by such a silica preferably exhibit a liquid content of at least 50% by weight, in particular of between 50 and 75% by weight, for example between 50 and 65% by weight.

Mention may also be made of the use, for example in an amount of the order of 60% by weight, of the silica of the invention as carrier for solvent and/or for oil in compositions based on polymers intended for the preparation of separating porous membranes for batteries (battery separator); the solvent and/or the oil carried, once extracted after extrusion/calendering, give rise to a network of pores.

The precipitated silicas according to the present invention, in particular the precipitated silicas S, or (capable of being) obtained by the process according to the invention described above can be incorporated as filler in dentifrice compositions during the preparation of said compositions, which can be provided in the paste or gel form, and can thus make it possible to thicken these compositions or to provide them with texture.

According to the invention, the silica can be used as thickening or texturing agent in a proportion of 0.1 to 20%, preferably of 0.5 to 15%, very particularly of 1 to 10%, by weight of the dentifrice composition.

Said dentifrice composition can additionally comprise other normal ingredients, in particular water-insoluble inorganic abrasive agents, optionally other thickening agents, humectants, colorants, antibacterials, fluorinated derivatives, flavorings, sweeteners, agents for combating tartar or plaque, bleaching agents, and the like.

The following example illustrates the invention without, however, limiting the scope thereof.

EXAMPLE 14 000 g of water and 630 g of a 236 g/l (as $SiO_2$ equivalent) aqueous sodium silicate solution were introduced into a reactor equipped with a system for regulating the temperature and pH and with a system for stirring with a 3-bladed propeller, the $SiO_2/Na_2O$ ratio by weight (Rw) of the sodium silicate used being 3.46.

After starting to stir (250 revolutions per minute), the vessel heel thus formed was heated to 95° C. and the pH was brought to 7.5, over 11 minutes, by addition of an 80 g/l aqueous sulfuric acid solution (mean flow rate of 61 g per minute).

Once the pH of 7.5 was reached, a simultaneous addition of 4320 g of a 236 g/l (as $SiO_2$ equivalent) aqueous sodium silicate solution (Rw=3.46), at a flow rate of 48 g/min (duration of the addition: 90 minutes), and of 4770 g of an 80 g/l aqueous sulfuric acid solution, at a flow rate of 53 g/min, was carried out, so as to maintain the pH of the medium at a value equal to 7.5 (to within about 0.1 pH unit).

After the period of addition of 90 minutes, the addition of silicate was halted and addition of acid was continued until the pH of the reaction mixture had stabilized at 3.4. Maturing was carried out by leaving the solution to stir for 5 minutes.

The slurry obtained was subsequently filtered on a flat filter and then the filtration cake obtained was disintegrated with water and with added maleic acid.

The disintegrated cake obtained exhibits a loss on ignition at 1000° C. of greater than 83%. It was subsequently dried by rotary atomization.

The dried silica was then milled using a classifier mill.

The physicochemical characteristics of the precipitated silica obtained, in the powder form, are as follows:
water uptake: 5.5%
$Na_2SO_4$ content: 0.20% (with respect to the total weight of the material in the dry state)
content of maleic acid+corresponding maleate, expressed as carbon: 0.04%
CTAB specific surface: 160 $m^2/g$
BET specific surface: 160 $m^2/g$
DOP oil uptake: 320 ml/100 g
mean particle size: 12 μm
pH: 5.5
loss on ignition at 1000° C.: 4.9%
residual water content after 2 hours at 105° C.: 2.6%

The invention claimed is:

1. A process for the preparation of a precipitated silica, the process comprising: mixing a fluidification agent which comprises a carboxylic acid with or adding same to a filtration cake resulting from a reaction of precipitation of a silica, during a disintegration operation of the filtration cake, so as to obtain a mixture, then drying the obtained mixture, wherein the precipitated silica comprises: a water absorption lower than 6%, a level of residual anion, expressed as alkaline metal sulfate, of less than 1% by weight based on the mass of the precipitated silica, and a content of carboxylic acid+corresponding carboxylate, expressed as carbon, of at least 0.02% by weight based on the mass of the precipitated silica.

2. The process as defined by claim 1, in which said carboxylic acid is selected from a group consisting of maleic acid, formic acid, octanoic acid, propionic acid or succinic acid.

3. A process for the preparation of a precipitated silica, the process comprising: reacting at least one silicate with at least one acidifying agent, to produce a precipitated silica suspension, filtering said precipitated silica suspension, to provide a filtration cake, and mixing a fluidification agent which comprises at least one carboxylic acid with said filtration cake or adding said at least one carboxylic acid thereto; during a disintegration operation, thereby obtaining a mixture, and drying the se-obtained mixture; wherein the precipitated silica comprises: a water absorption lower than 6%, a level of residual anion, expressed as alkaline metal sulfate, of less than 1% by weight based on the mass of the precipitated silica, and a content of carboxylic acid+corresponding carboxylate, expressed as carbon, of at least 0.02% by weight based on the mass of the precipitated silica.

4. The process as defined by claim 3, in which said carboxylic acid is selected from a group consisting of maleic acid, formic acid, octanoic acid, propionic acid or succinic acid.

5. The process according to claim 1, wherein no inorganic acid and no aluminum-based compound are employed during the disintegration operation.

6. The process according to claim 1, wherein the fluidification agent consists of the carboxylic acid.

7. The process according to claim 1, wherein the process is free of any stage of washing the filtration cake with a carboxylic acid.

8. The process according to claim 3, wherein the fluidification agent consists of the carboxylic acid.

9. The process according to claim 3, wherein the process is free of any stage of washing the filtration cake with a carboxylic acid.

10. The process according to claim 3, wherein the acidifying agent is free of any carboxylic acid and the process is free of any stage of washing the filtration cake with a carboxylic acid.

11. The process according to claim 1, wherein the precipitated silica has a content of carboxylic acid+corresponding carboxylate, expressed as carbon, of at least 0.04% by weight based on the mass of the precipitated silica.

12. The process according to claim 1, wherein the precipitated silica has a content of carboxylic acid+corresponding carboxylate, expressed as carbon, of at least 0.20% by weight based on the mass of the precipitated silica.

13. The process according to claim 3, wherein the precipitated silica has a content of carboxylic acid+corresponding carboxylate, expressed as carbon, of at least 0.04% by weight based on the mass of the precipitated silica.

\* \* \* \* \*